Dec. 2, 1969   R. L. ALONZO ET AL   3,481,729
GLASS MANUFACTURING CHAMBER CONTAINING BUOYANT
SIDE WALL LINERS OF GRAPHITE
Filed May 11, 1967   3 Sheets-Sheet 1

INVENTORS
RICHARD L. ALONZO
EUGENE H. AUGUSTIN
ROBERT J. GREENLER
ROBERT N. KRAMER

John R. Faulkner
William E. Johnson
ATTORNEYS

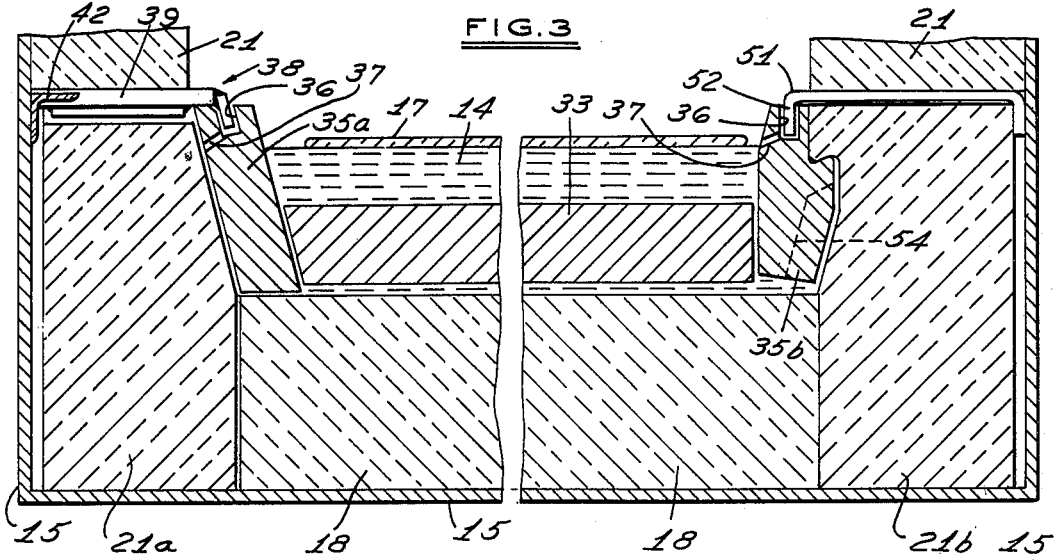
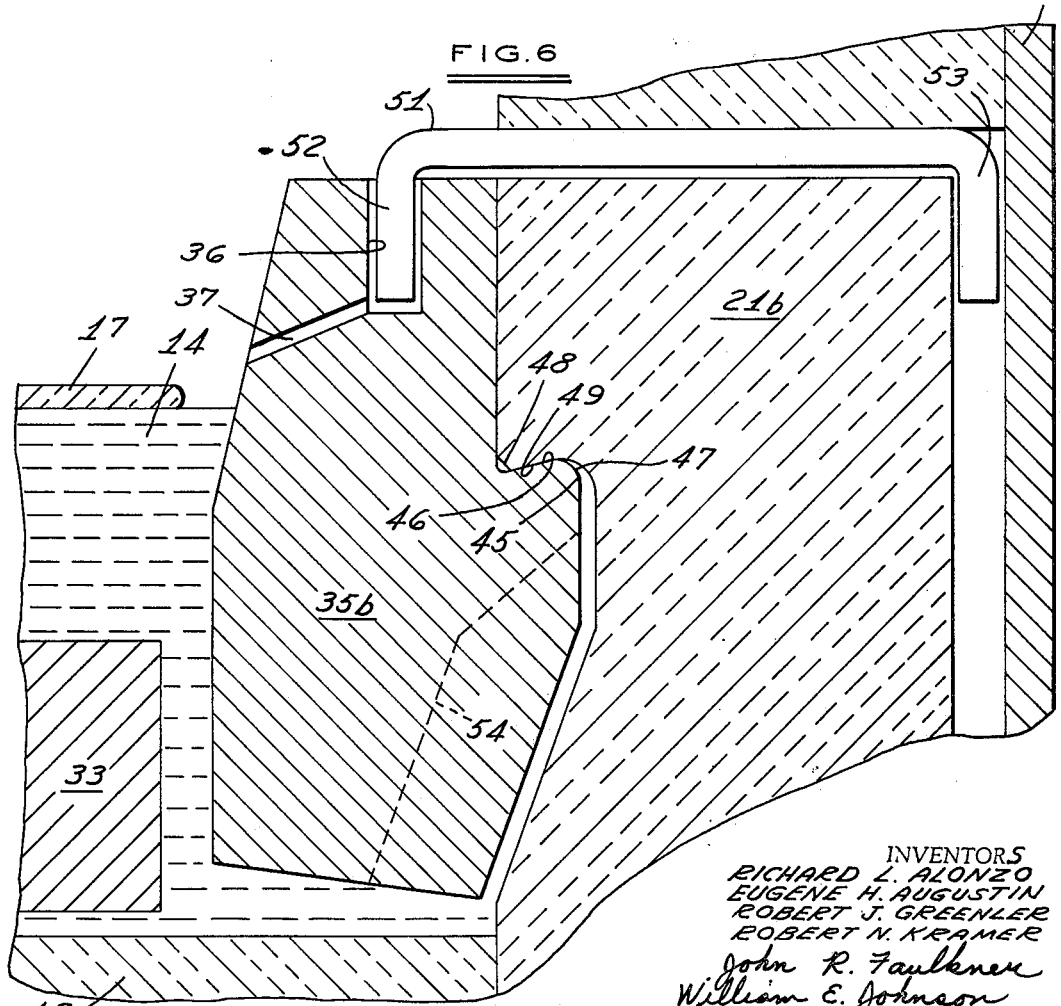

Dec. 2, 1969   R. L. ALONZO ET AL   3,481,729
GLASS MANUFACTURING CHAMBER CONTAINING BUOYANT
SIDE WALL LINERS OF GRAPHITE
Filed May 11, 1967   3 Sheets-Sheet 3
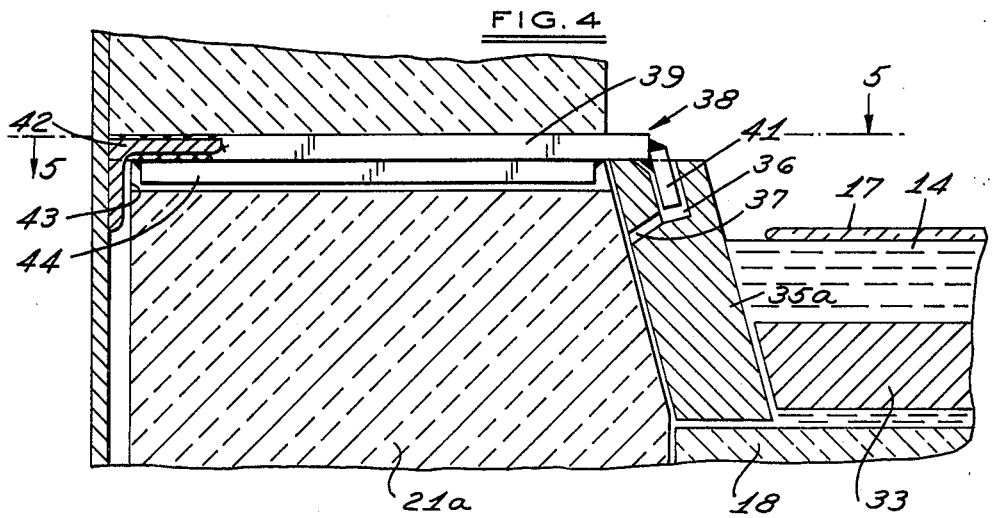
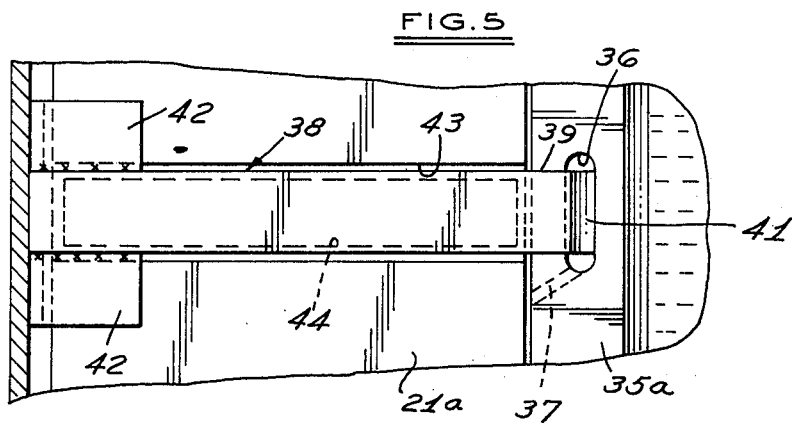
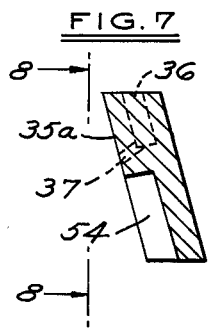
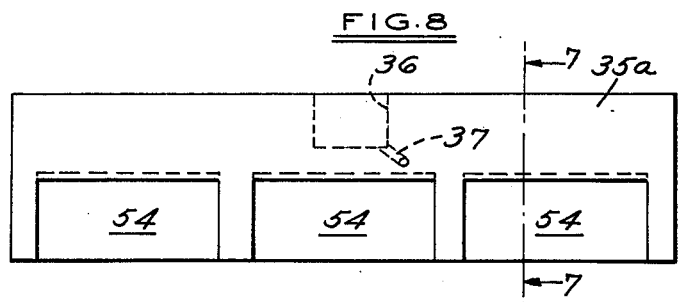
INVENTORS
RICHARD L. ALONZO
EUGENE H. AUGUSTIN
ROBERT J. GREENLER
ROBERT N. KRAMER
John R. Faulkner
William E. Johnson
ATTORNEYS

United States Patent Office 3,481,729
Patented Dec. 2, 1969

3,481,729
GLASS MANUFACTURING CHAMBER CONTAINING BUOYANT SIDE WALL LINERS OF GRAPHITE
Richard L. Alonzo, Nashville, Tenn., and Eugene H. Augustin, Dearborn Heights, Robert J. Greenler, Monroe, and Robert N. Kramer, Dearborn Heights, Mich., assignors to Ford Motor Company, Dearborn, Mich., a corporation of Delaware
Filed May 11, 1967, Ser. No. 637,733
Int. Cl. C03b 18/02
U.S. Cl. 65—182         8 Claims

ABSTRACT OF THE DISCLOSURE

A chamber utilized in the "float process" of manufacturing glass has a molten metal bath contained in the bottom portion thereof. The bottom is in part defined by refractory side blocks and these blocks have a side wall liner of graphite therealong. The graphite liner is partially submersed in the molten metal and because of the density differences, the metal exerts a buoyant force on the liner. The liner is maintained in a submersed position by a structure which engages a portion of the graphite liner and exerts a force thereon in a direction opposed to the buoyant force of the metal on the liner.

BACKGROUND OF THE INVENTION

This invention relates to a chamber for the manufacture of flat glass by the so-called "float process." In the "float process" molten glass is poured on the surface of a molten bath contained in a chamber to obtain a glass ribbon having true parallelism of its opposite faces and a lustrous fire-polished surface finish.

Generally, the "float process" involves pouring molten glass on a molten bath so as to form or float a sheet or ribbon of glass on the surface of the molten bath. The bath is formed from metal or salt having a density greater than that of molten glass. By known means, the molten glass is delivered at a uniform rate to the surface of the molten bath to form a ribbon of glass, the ribbon being advanced along the surface of the bath under thermal conditions which permit the leading portion of the ribbon to continuously harden to a degree sufficient to permit removal of the glass at the end of the bath without harming the surface of the ribbon.

The molten bath, which supports the glass, is contained within a substantially enclosed chamber having upper and lower refractory sections joined by suitable refractory side and end wall structures. The end wall structures, respectively, have therein entrance and exit passageways through which molten glass is fed to and the glass ribbon removed from the chamber. The lower refractory section forms the container for receiving and supporting the molten bath. Within the chamber, the space above the bath is filled with a protective atmosphere to prevent oxidation of the material making up the bath.

It has been found advantageous to position slabs of carbonaceous material in the pool of molten metal in order to prevent bubbles formed by the gassing of the refractory blocks from passing through the bath of molten metal and into engagement with the underside of the glass ribbon. Engagement of the underside of the glass ribbon by such gas bubbles creates depressions on the glass surface which result in subsequent scrapping of that portion of the glass. Since the carbonaceous material has a density substantially less than molten metal, it is necessary to anchor the slabs located in the bath against the buoyancy force of the bath which attempts to move the slabs to the top surface of the bath where they would float freely.

It has also been found advantageous to provide liners of carbonaceous materials along the lateral sides of the bath chamber. These side wall liners prevent damage to the glass ribbon when, for example, the glass ribbon accidentally comes into contact with a side wall of the chamber.

It has further been observed that beneficial results can be obtained in operation of the chamber when carbonaceous material, such as graphite, is in contact with both the molten metal bath, such as tin, and the protective atmosphere utilized in the chamber. More particularly, the presence of carbon material in the chamber assist in neutralizing quickly the effect of any atmospheric oxygen which seeps into the chamber as a result of the inevitable leakage in such a chamber. The carbon appears to react with the oxygen coming into the chamber to both prevent oxidation of the tin and to maintain the protective quality of the atmosphere gas utilized in the chamber.

As an incidental matter, the prevention of the oxidation of the tin within the chamber has also substantially eliminated the formation of "bloom" in the glass produced by the process. More particularly, the defect of "bloom," which is caused by the migration of tin into the surface layer of the glass, seems to in some manner be catalyzed or increased by the appearance of tin oxide within the molten metal bath of the chamber. Since the tin oxides have been reduced by utilizing both carbon slabs and side wall liners, the defect of "bloom" has also been substantially decreased.

In prior practice, difficulties were encountered in providing a suitable device for holding the side wall liners partially submersed in the molten metal of the bath. More particularly, there were no holders which would not only position the side wall liners adjacent the refractory side block but also hold the side wall liners in such a manner that they could be removed easily from the chamber for inspection, repair or replacement.

SUMMARY OF THE INVENTION

In accordance with the principles and teachings of this invention, the problems of the prior art relative to the construction and retention of side wall liners in the chamber utilized for manufacturing glass by the "float process" have been overcome.

More particularly, in accordance with the principles and teachings of this invention, a chamber utilized for the manufacture of flat glass has a ribbon of glass floated on a molten metal bath contained in a bottom portion of the chamber, the bottom portion being defined in part by refractory side blocks along the side walls of the chamber. A side wall liner, in juxtaposition to and located along the entire length of the refractory side blocks of the chamber, is formed of a material both nonwettable by glass and less dense than the molten metal forming the bath. The side wall liner is partially submersed in the molten metal bath and is held in that position by a suitable structure which both overlies and engages at least a portion of the liner. The structure exerts a force on the liner opposed to the buoyant force of the metal only when the liner is subjected to the buoyant force thereby maintaining the liner in its partiallyy submersed position in the molten bath. The holding structure, since it only overlies the liner and is not securely affixed thereto, allows easy removal of the liner.

BRIEF DESCRIPTION OF THE DRAWINGS

FIGURE 3 is a vertical section of the improved chamber incorporating, for illustrative purposes, two embodiments of the side wall liner forming the improvement of this invention. FIGURE 4 is an enlarged vertical section of a portion of the improved chamber depicting, in detail, a first embodiment of the side wall liner of this invention. FIGURE 5 is a plan view taken along line 5—5 of FIGURE 4. FIGURE 6 is an enlarged vertical section of a portion of the improvide chamber depicting, in detail, a second embodiment of the side wall liner of this invention. FIGURE 7 is a sectional view of the side wall liner of this invention modified in accordance with further teachings and principles of this invention. FIGURE 8 is a view of the modified side wall liner taken along line 8—8 of FIGURE 7.

DESCRIPTION OF THE PREFERRED EMBODIMENTS

Figure 1:
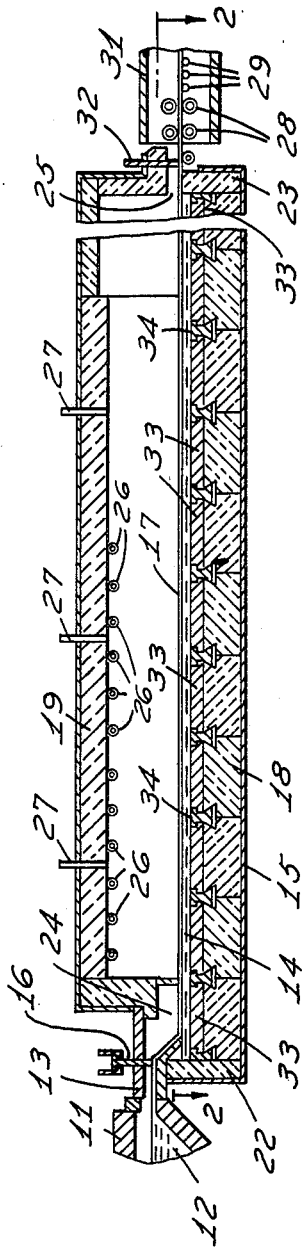
FIGURE 1 is a diagrammatic, longitudinal section of a float glass chamber modified in accordance with the principles and teachings of this invention.

Referring now to the drawings, in FIGURE 1 there is seen the delivery end of a conventional glass melting furnace 11 in which a constant level of glass 12 is maintained. The molten glass 12 is delivered through a forehearth 13 onto the the surface of a bath 14 of molten metal or salt contained within a chamber 15. A gate or tweel 16 controls the rate of glass 12 flowing from the furnace 11. The molten bath 14 has a density greater than that of the glass 12 so that the glass will float on the surface of the bath 14. By delivering the molten glass at a constant rate and withdrawing the continuous sheet thus formed at a constant rate, a continuous glass ribbon of uniform width is produced. Preferably, the bath 14 is a pool of molten tin but an alloy of tin or the like may also be utilized.

The chamber 15 comprises a lower refractory section 18, an upper refractory section 19, refractory side blocks 21 (FIGURE 2) and end walls 22 and 23 joined together except for a restricted entrance 24 and exit 25 to provide a substantially enclosed chamber 15. The refractory side blocks 21 and end walls 22 and 23 project above the top surface of the lower refractory 18 to define a container for the pool of molten tin 14.

To maintain the tin in a molten condition and the glass ribbon 17 at the proper temperatures required to form a ribbon of good optical quality, thermal regulation means such as electrical heaters 26 (FIGURE 1) are installed in the roof of the chamber 15. Heaters or electrodes may also be installed in the bath 14 if desired. Cooling means also may be provided to assure that the glass ribbon 17 will be sufficiently cooled and hardened to be removed through the exit 25 without damage to the ribbon. The heaters 26 are connected to a conventional power source (not shown) and may be individually controlled to provide the desired thermal gradient between the various zones of the chamber 15 to obtain the desired rate of cooling of the ribbon 17.

Preferably, the glass 12 is introduced into the chamber 15 at a temperature of about 1850° F. and then, the glass ribbon 17 is progressively cooled to a temperature of about 1100° F. at the exit 25.

A gas is introduced into the chamber through inlets 27 to provide a protective atmosphere. The gas should be inert to or reducing towards the material making up the bath. Such gases as nitrogen and/or hydrogen have been used for this purpose.

The cooled glass ribbon 17 is withdrawn by driven traction rolls 28 onto a conveyor 29 to enter an annealing lehr 31 where the ribbon 17 is further cooled under controlled conditions to remove or reduce residual stresses therein. The exit 25 of the tank structure may be provided with a sealing arrangement 32 to retain the protective gas in and prevent the entrance of outside atmosphere to the chamber.

Figure 2:
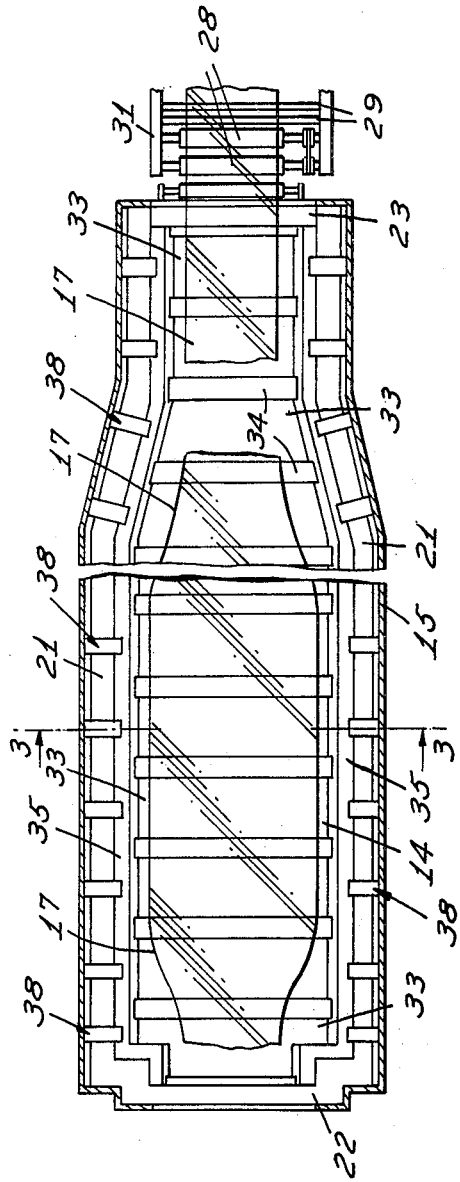
FIGURE 2 is a horizontal section of the improved chamber taken along line 2—2 of FIGURE 1.

As described in co-pending patent application Ser. No. 497,949, filed Oct. 19, 1965, and assigned to the same assignee as this application, now U.S. Patent 3,393,061, a series of rectangular slabs 33, preferably of a solid carbonaceous material, such as graphite, are provided in the float chamber 15. The slabs 33 are installed so as to cover the entire bottom area of the chamber (FIGURE 2). Portions of the glass ribbon 17 have been cut away in FIGURE 2 to more clearly depict the slab installation. Each slab 33 is held in position by a transversely extending key 34 in the manner specifically described in the mentioned co-pending application. The joints between the slabs and keys are not sealed and the molten tin bath is permitted to flow under the slabs as is depicted in FIGURE 3. The key 34 is made of the same material from which the slabs are made.

The slabs 33 are raised slightly above the lower refractory blocks 18 by the buoyant force exerted thereon by the molten tin. A depth of the tin bath above the slabs is maintained at a level of one-half to four inches in order to reduce the likelihood of the glass ribbon 17 coming into contact with the slabs 33 if and when the ribbon buckles within the chamber 15.

As best seen in FIGURE 3, the refractory side blocks 21 extend above the top surface of the lower refractory block 18. In accordance with the principles and teachings of this invention, a liner 35 comprising one continuous or, in the alternative, several slabs, is mounted adjacent the side blocks 21 for the entire length of the chamber 15. The liner 35 is preferably on both sides of the chamber 15. One embodiment of liner 35 of this invention is shown on the left hand side of the vertical section of FIGURE 3 and a second embodiment of liner 35 of this invention is shown on the right hand side of the vertical section of FIGURE 3.

In accordance with the principles and teachings of the first embodiment of the side wall liner of this invention, liner 35a is of a generally rectangular shape and the lower portion thereof is submersed in the molten metal bath 14. As best seen in FIGURES 2, 4 and 5, the liner 35a is provided with a plurality of spaced cavities 36 (one shown in FIGURES 4 and 5) extending downwardly from its top surface, which top surface is at approximately the same level as the top surface of the adjacent refractory side block 21a. A downwardly extending drain hole 37 places the bottom of each cavity 36 in communication with the outside of the liner 35a thus providing a means for draining molten metal from the various cavities 36.

In accordance with the detailed teachings of the first embodiment of the side wall liner of this invention, a plurality of hold-down means 38 are provided along the length of the liner 35a in accordance with the spacing of the cavities 36 along the length of the liner 35a. Each of the hold-down means 38 has as a main portion thereof a strap 39 extending through and beyond the associated side refractory block 21a. One end of each strap 39 extends outwardly from the side block and forms a downwardly turned hook end 41 which is received in an associated one of the cavities 36 of the side wall liner 35a.

An angular section 42 is welded to the other end of each of the straps 39. One leg of the angular section 42 is disposed intermediate the outward facing surface of the side block 21a and the outside wall of the chamber 15 in order to restrict lateral movement of the individual strap 39. The top surface of individual ones of the side blocks 21a are provided with slots 43, each slot receiving an individual one of a counterweight 44 welded to the underside of the strap 39. The counterweight applies a force on the hook end 41 of the strap and thus on the side wall liner 35a in a direction opposite the buoyant force applied on the liner by the molten metal bath.

The hold-down means 38 is preferably not permanently attached to the side block 21 but only has its counterweight portion 44 disposed in the slot 43 cut into the side block. This permits easy removal of the hold-down means 38 without the use of special tools or detachment or fasteners that might cause damage to the refractory side blocks 21a. More particularly, fasteners extending into refractory blocks have contributed to the cracking and chipping of the refractory, especially during abrupt changes in temperatures of the chamber which are sometimes encountered in the operation of the float process of producing glass.

The hold-down means 38 is fabricated from a high temperature resistant metallic alloy or ceramic to minimize creep in the high temperature encountered in the float process. A nickel alloy such as AISI B47–SS may be utilized. The counter-weight portion 44 is designed to be sufficiently heavy that it will provide ample force to counteract the buoyant force of the molten tin tending to move the side liner 35a upwardly. It should be noted that the hook end 41 of the strap 39 disposed in the cavity 36 also restricts lateral movement of the liner 35a. The drain hole 37 drains any molten tin that may enter the cavity 36 to minimize corrosive interaction between the hot molten tin and the hook end 41. The placement of the angular section 42 of the hold-down means 38 and the reception of the counterweight 44 in the slot 43 combines to eliminate all horizontal movement of the hold-down means 38 relative to the side block 21a.

In accordance with the teachings of the second embodiment of the side wall liner of this invention, in FIGURE 6 there is seen a side wall liner 35b depicting the structural details of the second embodiment of this invention. The liner 35b is formed from a carbonaceous material such as graphite and therefore has a substantially lower density than the molten metal bath 14. The surface of the liner 35b facing the refractory side wall 21b of the chamber 15 has a shoulder 45 that extends outwardly of the liner 35b intermediate the top and bottom thereof. The shoulder 45 has its upper surface 46 extending generally in an outward and upward direction toward the refractory side block 21b with the edge of the shoulder 45 terminating in a radius 47.

The refractory side block 21b, in this second embodiment of the side wall liner of this invention, is provided with a lip 48 that extends towards the side wall liner 35b. The lip 48 has a bottom surface 49 thereof extending in a direction generally inward and downward of the side wall liner 35b with the edge of the lip 48 chamfered to prevent chipping thereof. The shoulder 45 and lip 48 are preferably formed integrally with the side wall liner 35b and side block 21b, respectively.

A plurality of cavities 36 and drain holes 37 may be provided along the length of the side wall liner 35b as described in the previously discussed first embodiment of the side wall liner. To assure full retention of the liner 35b in juxtaposition with the side block 21b, it is generally desirable, but not absolutely necessary, to lay a plurality of hangers 51 onto the top surface of the side block 21b. Each of these hangers 51 has a bent portion 52 at one end thereof that is received in an individual one of the cavities 36 and an angular portion 53 at the other end thereof that is disposed between the side block 21b and the outside wall of the chamber 15. The hangers 51 do not have to be of creep resistant material as they are not the sole means of securing the side wall liner 35b in the molten bath.

The advantages of the side wall liner 35b of the second embodiment of this invention lies in its ease of both installation and removal from the chamber 15 and its novel integral shoulder 45 that engages the lip 48 of the side block 21b to serve as a hold-down and retention means for the liner 35b. To install the liner 35b, the liner is placed in juxtaposition to the side block 21b and then submersed into the molten metal bath 14 until the shoulder 45 is disposed underneath the lip 48. Then, as the liner 35b is released, the upper surface 46 of the shoulder 45 is forced into abutment with the bottom surface 49 of the lip 48 of the side block 21b by the buoyant force acting on the liner 35b, thereby, securely retaining the liner 35b in juxtaposition to the side block 21b. The lightweight hanger 51 does not provide a force to counter the buoyant force but only assists in preventing lateral movement of the liner 35b. Downward pressure on the liner 35b will readily cause its disengagement from the side block 21b. A further advantage of the second embodiment of this invention is the elimination of the creep resistant counterweighted straps 39. More particularly, the metal forming the hangers 51 does not have to be creep resistant and therefore, the hangers 51 are less expensive than the straps 37 of the first embodiment.

In FIGURES 6 and 7, there is shown the side wall liner 35a which has been modified in accordance with further teachings of this invention. The side wall liner has had selected portions of the backside thereof hollowed out without unduly weakening the same by cutting spaced cavities 54 thereinto. By removing a substantial amount of material from the liner 35a, the force required to counter the buoyant force applied to the liner by the molten metal is reduced. In the first embodiment of the invention, this permits the utilization of a more economical, less massive hold-down means 38. Such cavities 54 can also be cut into side wall liner 35b of the second embodiment (FIGURE 6) of this invention if desired.

What is claimed is:
1. A chamber utilized for the manufacture of flat glass by floating a ribbon of glass on a molten metal bath contained in a bottom portion of the chamber comprising refractory side blocks along the bottom portion of the side walls of the chamber in part defining the bottom portion of the chamber, the upper surface of each of said refractory side blocks having slots therein; a side wall liner in juxtaposition to and located along the entire length of said refractory side blocks of the chamber and partially submerged in the molten metal bath; said side wall liner being formed from graphite whereby said liner is subjected to a buoyant force in its partially submerged position, said side wall liner having cavities in the top surface thereof at spaced intervals along the length thereof corresponding to the said slots in said refractory side blocks; and a plurality of straps of heat resistant metallic alloy equal in number to the cavities in said liner, individual ones of said straps being spaced along the length of said liner with each strap having a counterweighted center portion thereof received within and extending from an associated one of said slots of said refractory side blocks, the portion of said straps extending outwardly from the refractory side blocks forming downwardly turned hook ends which hook ends are received in an individual one of said cavities in said side wall liner thereby to exert a force on said liner opposed to the buoyant force of said molten metal on said liner whereby said liner is maintained in its partially submerged position in said molten metal bath, the opposite end of each of said straps being formed so as to be insertable between said refractory side block and the outer side wall of said chamber thereby to restrict movement of each of said individual straps.

2. The improved chamber for utilization in the manufacture of flat glass as defined in claim 1 wherein each of said cavities of said side wall liner has a drain hole from the bottom portion of said cavity to the outside surface of said liner whereby molten metal which enters said cavity is free to flow through said drain hole and return to the molten metal bath.

3. The improved chamber for utilization in the manufacture of flat glass as defined in claim 2 wherein said side wall liner has portions thereof hollowed out to reduce the buoyant force exerted thereon by said molten metal bath, said hollowed out portions facing said refractory side block when said liner is in its submersed position.

4. A chamber utilized for the manufacture of flat glass by floating a ribbon of glass on a molten metal bath contained in a bottom portion of the chamber comprising refractory side blocks along the bottom portion of the side walls of the chamber in part defining the bottom portion of the chamber; a side wall liner in juxtaposition to and located along the entire length of the refractory side blocks of the chamber and partially submersed in the molten metal bath, said side wall liner being formed from graphite whereby said liner is subjected to a buoyant force in its partially submersed position; a shoulder on said liner extending upward therefrom toward the associated refractory side block when said liner is in a submersed position; and a lip on said refractory side block extending downward therefrom toward said side wall liner when said liner is in a submersed position, said lip of said refractory side block overlying and engaging said shoulder of said side wall liner and exerting a force on said liner opposing the buoyant force of the molten metal on said liner thereby to maintain said liner in its partially submersed position in the molten metal bath.

5. The improved chamber for utilization in the manufacture of flat glass as defined in claim 4 wherein a substantial portion of the surface of said lip on the refractory side block is inclined downwardly toward said side wall liner when said liner is in its submersed position; and wherein a substantial portion of the surface of said shoulder on said side wall liner is inclined upwardly toward the refractory side block when said liner is in its submersed position such that said side wall liner is maintained in its submersed position by engagement of said two surfaces.

6. The improved chamber for utilization in the manufacture of flat glass as defined in claim 5 wherein said side wall liner has means defining a plurality of cavities in the top surface thereof; and wherein a plurality of hangers are provided for additional support of said side wall liner, each hanger extending outwardly of said refractory side block and forming downwardly turned hook ends, said hook end of each of said hangers received in an individual one of said cavities of said side wall liner to prevent lateral movement of said side wall liner with respect to the refractory side block.

7. The improved chamber for utilization in the manufacture of flat glass as defined in claim 6 wherein each of said cavities of said side wall liner has means defining a drain hole from the bottom portion of said cavity to the outside surface of said side wall liner whereby molten metal which enters said cavity is free to flow through said drain hole and return to the molten metal bath.

8. The improved chamber for utilization in the manufacture of flat glass as defined in claim 7 wherein said side wall liner has portions thereof hollowed out to reduce the buoyant force exerted thereon by said molten metal bath, said hollowed out portions facing the refractory side block when said liner is in its submersed position.

References Cited
UNITED STATES PATENTS

| | | | |
|---|---|---|---|
| 549,427 | 11/1895 | Baudox et al. | 65—134 |
| 1,538,169 | 5/1925 | Conklin | 65—343 |
| 3,134,660 | 5/1964 | Long | 65—374 X |
| 3,266,880 | 8/1966 | Pilkington | 65—182 |
| 3,393,061 | 7/1968 | Greenler | 65—182 |

S. LEON BASHORE, Primary Examiner

E. R. FREEDMAN, Assistant Examiner

U.S. Cl. X.R.
65—65, 99, 184, 374